Oct. 15, 1935. J. A. HILLERICH 2,017,060
LAMINATED STRIP FOR SPORTING GOODS AND METHOD OF MAKING THE SAME
Filed Nov. 25, 1932
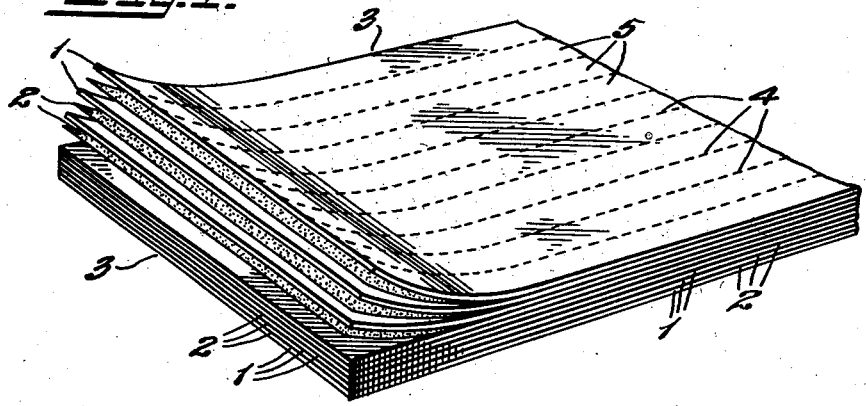
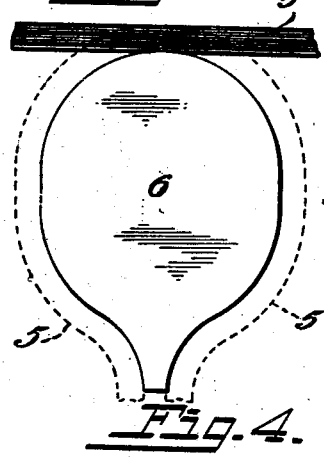
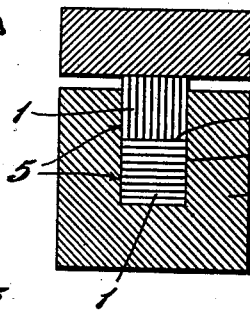
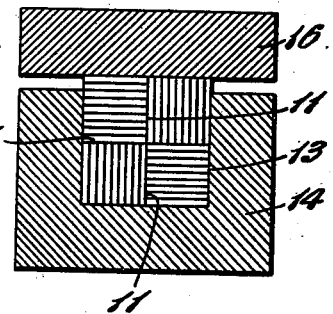
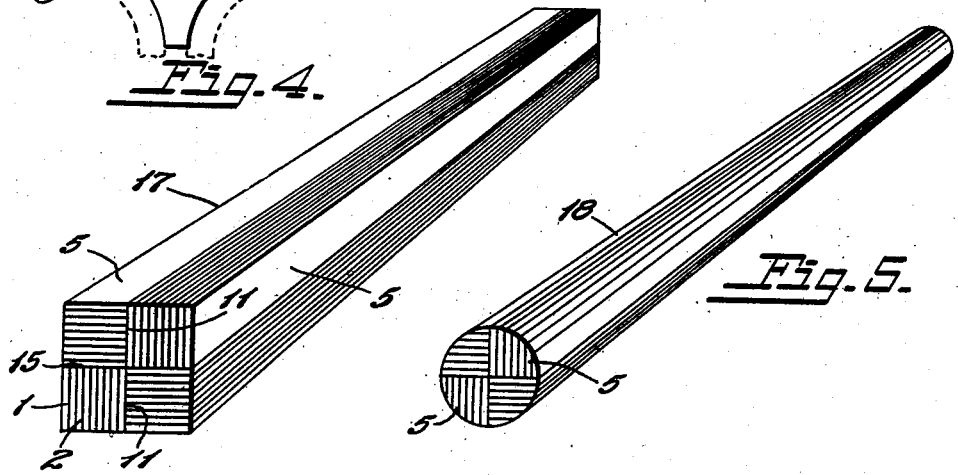
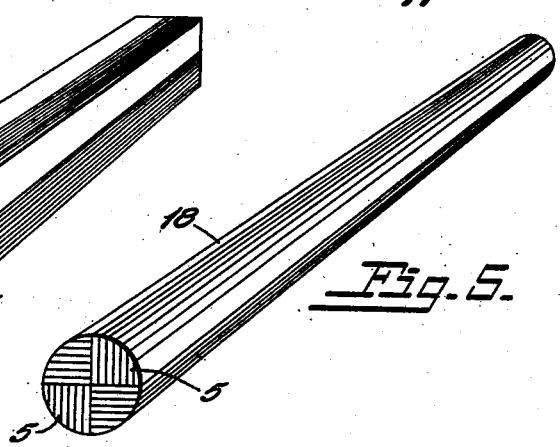
Inventor
John A. Hillerich
By Low & Low
Attorneys Patented Oct. 15, 1935

2,017,060

UNITED STATES PATENT OFFICE 2,017,060

LAMINATED STRIP FOR SPORTING GOODS AND METHOD OF MAKING THE SAME

John A. Hillerich, Louisville, Ky.

Application November 25, 1932, Serial No. 644,347

1 Claim. (Cl. 144—309)

The invention relates to laminated wooden strips or billets for use in the manufacture of sporting goods such as golf club shafts, baseball bats, bowling pins, hockey sticks, javelins, tennis rackets and frames therefor and the like, and to a method of making the same.

One of the objects of the present invention is to provide a laminated strip or billet for the above described purposes which is of relatively light weight and which is very strong and free from a tendency to split along the planes of union between the several laminæ.

Another object of the invention is to provide a method of producing an article, of the character described, which comprises arranging a plurality of strips of wood in superposed relation with interposed sheets of dry glue film of uniform thickness and subjecting the assembly to heat and pressure alone in the absence of moisture, whereby the glue film is softened and is incorporated in the wood fiber uniformly throughout its length and breadth so as to effect a union between the wooden strips which is so intimate as to be scarcely noticeable to the eye and at the same time exceedingly strong and free from a tendency to split or warp.

With such objects in view, as well as other advantages which may be incident to the use of the improvements, the invention consists in the procedure and in the parts and combinations hereinafter set forth and claimed, with the understanding that the several necessary elements constituting the same may be varied in proportions and arrangement without departing from the nature and scope of the invention.

In order to make the invention more clearly understood there are shown in the accompanying drawing means for carrying the same into practical effect, without limiting the improvements, in their useful applications, to the particular constructions which, for the purpose of explanation, have been made the subject of illustration.

In the said drawing:—

Figure 1 is a perspective view of a portion of a built-up slab or composite piece of laminated or veneer wood, constructed in accordance with the invention, one end of said slab being shown separated to more clearly illustrate the several laminations and interposed sheets of glue film.

Figure 2 is a diagrammatic vertical sectional view illustrating the method of firmly uniting two strips cut from the slab shown in Fig. 1, by application of heat and pressure only, to firmly unite the laminations and interposed sheets of dry glue film.

Figure 3 is a similar view illustrating the method of securing four laminated sections together by heat and pressure alone to provide a composite billet in which the laminations of each of the sections extend transversely or at right angles to the laminations of the adjacent sections.

Figure 4 is a perspective view of the laminated billet constructed as shown in Figure 3.

Figure 5 is a perspective view of a portion of a laminated shaft produced from the billet shown in Figure 4.

Figure 6 illustrates the manner of bending one or more of the laminated strips to form a tennis racket frame.

Referring to the drawing, I arrange a plurality of relatively thin sheets of wood 1 in superposed relation with interposed sheets of dry glue film 2 to form a composite sheet or slab 3 such as that shown in Figure 1. In practicing the invention I employ sheets of dry glue film which is commercially known and obtainable and consists of thin sheets of dry glue of uniform thickness which is rendered adhesive when subjected to heat. The composite slab 3 is sawed along the dotted lines 4 indicated in Figure 1 so as to provide a plurality of laminated strips or sections 5 of any desired width and which are further utilized in carrying out my invention.

A pair of sections or strips 5, cut from the slab 3, are placed within an elongated recess 9 of proper depth in a lower heated die member 10, preferably with the laminations 1 of one strip extending at right angles to the laminations of the superposed strip and with one or more sheets of glue film 11 interposed between the strips, as shown in Figure 2. The strips are subjected to pressure exerted by an upper heated die member 12 during which the glue film 11 is rendered soft and adhesive by the heat and molecularly unites with the fibrous structure of the wood. As soon as the glue becomes set the two strips are removed from the die 10 as a firmly united unitary structure and two pairs of such strips are placed within a recess 13 of proper size in a third lower heated die member 14 in superposed relation with one or more strips of glue film 15 interposed therebetween (Fig. 3). The strips of wood are then again subjected to heat and pressure by means of an upper heated die member 16 so as to soften the glue film and compress the several sections firmly together so as to form a composite billet 17 such as is shown in Figure 4. The billet 17 may be dressed and finished to be subsequently bent into elliptical form to provide a frame for a tennis racket or the like, (Fig. 6) or the billet may be placed in a lathe and turned to provide a cylindrical shaft 18 of the desired diameter and configuration, such as that shown in Figure 5, for use as a baseball bat, shaft of a golf club or the like.

A supporting goods shaft manufactured as above described is exceedingly strong and highly resistant to strains imposed from any direction, and the union between the several laminations is so uniform as to be scarcely noticeable to the eye.

By employing a dry glue which is previously prepared in tissue-like sheets having a uniform thickness, the adhesive is distributed in uniform quantities over the entire surface area throughout the length and breadth of the wooden strips or laminations and not irregularly with lumps and dry spots as is invariably the case when a liquid glue is spread upon the surfaces of the wood. When heat and pressure is subsequently applied the dry glue becomes soft and impregnates the fibrous texture of the wood thus effecting a very intimate union between the laminations.

It will be noted further than the described laminated billet is constructed by heat and pressure alone and with a total absence of moisture which is a distinct advantage in sporting goods shafts since there is no warping tendency which might otherwise result in building up such a laminated structure.

A golf or sporting goods shaft constructed in accordance with my invention is possessed of the desired uniform stiffness on all sides and regardless of the angle at which the strain is imposed. The ordinary shaft has stiffness on two sides only.

The dry glue film employed is absolutely impervious to hot or cold water which adds to the durability and life of the shaft in use and insures against separation of the laminæ of the shaft.

As shown in Figure 6, one or more of the laminated strips or sections 5 may be bent around a heated or other form 6 as shown in dotted lines in said figure, and pressed tightly thereagainst, preferably with the application of heat, to obtain a tennis racket frame or like article of desired curved configuration. After being shaped in this manner the strip may be removed from the form and it has been found that no cracking or separation whatsoever of the laminæ takes place as a result of the bending operation.

The invention also contemplates the use of a single laminated strip or section with the veneers thereof secured together in the manner described, for use in a golf shaft or the like, or if a plurality of sections are used the respective laminations thereof may extend at any desired angle relative to each other. In other words the success and utility of the invention is not dependent upon or limited to the use of four laminated strip-like sections with the laminæ of adjacent sections extending at right angles to each other, as has been illustrated.

What I claim is:

The method of making sporting goods shafts designed for absorbing shocks imparted thereto in a radial direction with respect to the axis of the shaft, which method comprises assembling a plurality of sections of laminated wood in contiguous relation in the dry state with the laminations of one strip extending at right angles to those of an adjacent strip, interposing integral self-supporting sheets composed entirely of dry glue film of uniform thickness between contiguous sections, subjecting the assembled sections to soften said glue films, applying pressure to said assembly to cause the entire softened glue sheets to become completely incorporated in and uniformly absorbed by the fibrous textures of the wood and to press the adjacent laminated sections of wood into intimate contact with one another to form a composite billet, and turning the composite billet thus obtained to the desired diameter and configuration, whereby the completed shaft is resistant to shocks and strains imparted from any direction radial to the axis of the shaft.

JOHN A. HILLERICH.